(12) United States Patent
Kolesnikov et al.

(10) Patent No.: US 10,860,342 B2
(45) Date of Patent: Dec. 8, 2020

(54) COMPUTER SYSTEM PROVIDING CLOUD-BASED SESSION PRELAUNCH FEATURES AND RELATED METHODS

(71) Applicant: Citrix Systems, Inc., Fort Lauderdale, FL (US)

(72) Inventors: Yuri Kolesnikov, Raleigh, NC (US); Leo C Singleton, IV, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 171 days.

(21) Appl. No.: 15/418,872

(22) Filed: Jan. 30, 2017

(65) Prior Publication Data

US 2018/0217850 A1    Aug. 2, 2018

(51) Int. Cl.
*G06F 9/451*    (2018.01)
*G06F 3/14*    (2006.01)
(Continued)

(52) U.S. Cl.
CPC ............ *G06F 9/452* (2018.02); *G06F 3/1454* (2013.01); *G06F 9/45558* (2013.01);
(Continued)

(58) Field of Classification Search
CPC .................. G06F 3/1454; G06F 9/452; G06F 2009/45595; G06F 9/45558; G06F 9/5061; G06F 2009/4557; G06F 2209/5011; G06F 3/0482; G06F 8/61; G06F 9/4445; G06F 9/455; G06F 9/45504; G06F 9/45533; G06F 9/468; G06F 9/5011; G06F 9/5077; G06F 15/16; G06F 1/3209; G06F 1/3231; G06F 2009/45562; G06F 2009/45575; G06F 21/33; G06F 21/141; G06F 21/53; G06F 2221/2149; G06F 3/04815; G06F 9/5044; H04L 65/103; H04L 65/1069;
(Continued)

(56) References Cited

U.S. PATENT DOCUMENTS 7,340,522 B1 *    3/2008    Basu .................... G06F 9/5033
                                                            709/217
7,774,457 B1 *    8/2010    Talwar ................. G06F 9/5072
                                                            709/224
(Continued)

OTHER PUBLICATIONS

Lynda Raley "Improve appication launch times with Session Manager in Citrix cloud labs" http://docs.citrix.com/en-us/citrix-cloud/about-citrix-cloud-labs/session-manager.html: retrieved from internet Dec. 30, 2016 pp. 4.

(Continued)

*Primary Examiner* — Greg C Bengzon
(74) *Attorney, Agent, or Firm* — Allen, Dyper, Doppelt + Gilchrist, PA

(57) ABSTRACT

A computing system may include a virtualization server configured to run virtual sessions for a plurality of client devices. The system may further include a cloud computing service configured to prelaunch virtual sessions in a prelaunch session pool at the virtualization server without being requested by the plurality of client devices. Furthermore, the virtualization server may be configured to assign the virtual sessions from the prelaunch session pool to respective client devices on demand.

16 Claims, 7 Drawing Sheets

(51) Int. Cl.
  *G06F 9/455* (2018.01)
  *H04L 29/08* (2006.01)
(52) U.S. Cl.
  CPC .... *H04L 67/141* (2013.01); *G06F 2009/4557* (2013.01); *G09G 2358/00* (2013.01); *G09G 2370/02* (2013.01); *G09G 2370/027* (2013.01); *G09G 2370/047* (2013.01); *G09G 2370/16* (2013.01)
(58) Field of Classification Search
  CPC ......... H04L 67/12; H04L 67/42; H04L 63/08; H04L 63/10; H04L 67/141; H04L 12/2863; H04L 12/2874; H04L 12/4654; H04L 45/02; H04L 45/50; H04L 47/125; H04L 47/70; H04L 49/70; H04L 63/02; H04L 63/0272; H04L 63/0281; H04L 63/0428; H04L 63/0807; H04L 63/0815; H04L 63/083; H04L 63/102; H04L 63/104; H04L 65/4069; H04L 65/602; H04L 65/604; H04L 65/607; H04L 67/025; H04L 67/08; H04L 67/10; H04L 67/1031; H04L 67/1095; H04L 67/125; H04L 67/14; H04L 67/142; H04L 67/143; H04L 67/20; H04L 67/24; H04L 67/28; H04L 67/2809; H04L 67/306; H04L 67/36; H04L 67/38; H04L 65/1066; H04N 21/41407; H04N 21/4143; H04W 4/00
  See application file for complete search history.

(56) References Cited

U.S. PATENT DOCUMENTS

| | | | | |
|---|---|---|---|---|
| 7,870,153 B2* | 1/2011 | Croft | ................... | G06F 9/45533 707/781 |
| 8,141,075 B1* | 3/2012 | Chawla | ............... | G06F 9/45558 718/1 |
| 8,205,072 B1* | 6/2012 | Gentil | ................... | G06F 21/53 713/153 |
| 8,281,377 B1* | 10/2012 | Snow | ................... | H04L 65/604 726/7 |
| 8,555,274 B1* | 10/2013 | Chawla | ................... | G06F 9/452 718/1 |
| 8,949,408 B2* | 2/2015 | Belkine | ................ | G06F 11/301 709/224 |
| 9,015,328 B2* | 4/2015 | Scavo | ................... | H04L 29/06 709/227 |
| 9,055,139 B1* | 6/2015 | Devireddy | ............... | H04L 67/42 |
| 9,210,212 B2* | 12/2015 | Ivashin | ................ | G06F 3/1454 |
| 9,256,452 B1* | 2/2016 | Suryanarayanan | ................... | G06F 9/45558 |
| 9,317,333 B2* | 4/2016 | Wilkinson | ............. | H04L 67/327 |
| 9,537,935 B2* | 1/2017 | Dryden | ............... | G06F 13/4221 |
| 9,614,748 B1* | 4/2017 | Battersby | ......... | H04N 21/41407 |
| 9,723,053 B1* | 8/2017 | Pallemulle | .......... | H04L 67/2847 |
| 10,075,459 B1* | 9/2018 | Suryanarayanan | ................... | H04L 63/0272 |
| 10,110,578 B1* | 10/2018 | Baer | ................... | H04L 63/08 |
| 10,152,449 B1* | 12/2018 | Ward, Jr. | ............... | G06F 15/173 |
| 10,200,478 B1* | 2/2019 | Franke | ................... | H04L 67/141 |
| 10,318,320 B1* | 6/2019 | Thomas | ................... | G06F 9/5077 |
| 10,367,802 B2* | 7/2019 | Koushik | ............... | H04L 63/0853 |
| 10,409,625 B1* | 9/2019 | Suryanarayanan | ................... | G06F 11/1433 |
| 10,498,807 B2* | 12/2019 | Rivera | ................... | G06F 9/5072 |
| 2002/0038333 A1* | 3/2002 | Evans | ................... | G06F 9/461 718/107 |
| 2004/0267897 A1* | 12/2004 | Hill | ................... | G06F 9/505 709/217 |
| 2006/0122955 A1* | 6/2006 | Bethlehem | ............ | H04L 63/102 |
| 2006/0291481 A1* | 12/2006 | Kumar | .............. | H04L 29/06027 370/400 |
| 2007/0019670 A1* | 1/2007 | Falardeau | ............... | H04W 48/18 370/465 |
| 2007/0118888 A1* | 5/2007 | Styles | ................... | G06F 21/575 726/5 |
| 2007/0239859 A1* | 10/2007 | Wilkinson | ............... | H04L 63/08 709/220 |
| 2007/0244987 A1* | 10/2007 | Pedersen | ................. | H04L 67/06 709/217 |
| 2007/0282951 A1* | 12/2007 | Selimis | ................... | H04L 67/06 709/205 |
| 2007/0288572 A1* | 12/2007 | Busa | ...................... | G06Q 10/06 709/205 |
| 2008/0147787 A1* | 6/2008 | Wilkinson | ............... | G06F 9/505 709/203 |
| 2009/0106571 A1* | 4/2009 | Low | ........................ | G06F 9/505 713/310 |
| 2009/0287834 A1* | 11/2009 | Alcorn | ................... | G06F 21/305 709/229 |
| 2010/0318511 A1* | 12/2010 | Phan | ...................... | G06Q 10/10 707/722 |
| 2010/0332643 A1* | 12/2010 | Benari | .................. | G06F 9/5077 709/224 |
| 2011/0004680 A1* | 1/2011 | Ryman | .................... | H04L 67/14 709/224 |
| 2011/0153716 A1* | 6/2011 | Malakapalli | ............ | G06F 9/452 709/203 |
| 2011/0153838 A1* | 6/2011 | Belkine | ................. | G06F 11/301 709/227 |
| 2011/0161506 A1* | 6/2011 | Dickerson | ............... | H04L 67/14 709/228 |
| 2011/0162062 A1* | 6/2011 | Kumar | ................ | H04L 63/0272 726/15 |
| 2011/0224811 A1* | 9/2011 | Lauwers | .................... | G06F 3/16 700/94 |
| 2011/0246904 A1* | 10/2011 | Pinto | ....................... | G06F 9/452 715/740 |
| 2011/0251992 A1* | 10/2011 | Bethlehem | ............ | H04L 67/306 707/610 |
| 2011/0276661 A1* | 11/2011 | Gujarathi | ................ | G06F 9/452 709/219 |
| 2011/0307544 A1* | 12/2011 | Lotlikar | ................... | G06F 9/468 709/203 |
| 2012/0084369 A1* | 4/2012 | Henriquez | .............. | H04L 67/08 709/206 |
| 2012/0096365 A1* | 4/2012 | Wilkinson | ............... | G06F 9/468 715/740 |
| 2012/0110572 A1* | 5/2012 | Kodi | ................... | G06F 9/45558 718/1 |
| 2012/0226742 A1* | 9/2012 | Momchilov | .......... | G06F 3/0481 709/203 |
| 2012/0297311 A1* | 11/2012 | Duggal | ................... | H04L 63/102 715/740 |
| 2012/0331032 A1* | 12/2012 | Balachandran | ....... | H04L 69/164 709/202 |
| 2013/0007737 A1* | 1/2013 | Oh | .......................... | G06F 9/452 718/1 |
| 2013/0042123 A1 | 2/2013 | Smith et al. | | |
| 2013/0066945 A1* | 3/2013 | Das | ....................... | H04L 69/329 709/203 |
| 2013/0067345 A1* | 3/2013 | Das | ....................... | H04L 41/12 715/740 |
| 2013/0067469 A1* | 3/2013 | Das | ....................... | G06F 9/5077 718/1 |
| 2013/0073703 A1* | 3/2013 | Das | ....................... | H04L 67/306 709/223 |
| 2013/0074064 A1* | 3/2013 | Das | ....................... | G06F 9/5077 718/1 |
| 2013/0074179 A1* | 3/2013 | Das | ..................... | H04L 63/0838 726/18 |
| 2013/0093776 A1* | 4/2013 | Chakraborty | .......... | G06F 9/505 345/520 |
| 2013/0219468 A1* | 8/2013 | Bell | .................... | H04L 63/0428 726/4 |
| 2013/0297802 A1 | 11/2013 | Laribi et al. | | |

(56) References Cited

U.S. PATENT DOCUMENTS

| | | | |
|---|---|---|---|
| 2014/0115028 A1* | 4/2014 | Taylor | H04L 67/141 709/202 |
| 2014/0245418 A1* | 8/2014 | Balasaygun | G06F 21/41 726/9 |
| 2014/0289639 A1* | 9/2014 | Halim | G06F 9/452 715/740 |
| 2014/0304352 A1* | 10/2014 | Chaudhary | G06F 9/5011 709/208 |
| 2014/0304409 A1* | 10/2014 | Kamath | H04L 63/166 709/225 |
| 2014/0344448 A1 | 11/2014 | Rjeili et al. | |
| 2014/0366093 A1* | 12/2014 | Oh | G06F 21/10 726/3 |
| 2014/0372356 A1* | 12/2014 | Bilal | G06F 9/445 706/46 |
| 2014/0373032 A1* | 12/2014 | Merry | G06F 9/54 719/328 |
| 2015/0006614 A1* | 1/2015 | Suryanarayanan | H04L 67/148 709/203 |
| 2015/0019704 A1* | 1/2015 | Suryanarayanan | G06F 11/3433 709/224 |
| 2015/0019705 A1* | 1/2015 | Suryanarayanan | H04L 41/0893 709/224 |
| 2015/0019728 A1* | 1/2015 | Suryanarayanan | G06F 9/452 709/225 |
| 2015/0019733 A1* | 1/2015 | Suryanarayanan | H04L 67/141 709/226 |
| 2015/0032436 A1* | 1/2015 | van de Kamp | G06F 9/455 703/13 |
| 2015/0039601 A1* | 2/2015 | Harrang | G06F 16/9535 707/727 |
| 2015/0040122 A1 | 2/2015 | Singleton, IV et al. | |
| 2015/0058967 A1* | 2/2015 | Ringdahl | H04L 63/0263 726/11 |
| 2015/0113528 A1* | 4/2015 | Kim | G06F 9/452 718/1 |
| 2015/0142982 A1* | 5/2015 | Gonzales | H04L 65/1069 709/227 |
| 2015/0178059 A1* | 6/2015 | Lindheimer | H04L 67/10 717/178 |
| 2015/0201004 A1* | 7/2015 | Moon | H04L 67/10 709/203 |
| 2015/0237097 A1* | 8/2015 | Devireddy | H04L 67/42 709/203 |
| 2015/0241941 A1* | 8/2015 | Luna | G06F 16/9574 713/320 |
| 2015/0256474 A1* | 9/2015 | Ringdahl | G06F 9/46 709/226 |
| 2015/0264035 A1 | 9/2015 | Waterhouse et al. | |
| 2015/0339136 A1* | 11/2015 | Suryanarayanan | G06F 9/455 718/1 |
| 2015/0341428 A1* | 11/2015 | Chauhan | H04L 12/6418 709/203 |
| 2015/0350338 A1* | 12/2015 | Barnett | H04L 67/22 709/203 |
| 2015/0373148 A1* | 12/2015 | He | H04L 67/34 709/203 |
| 2016/0055016 A1* | 2/2016 | Beveridge | G06F 9/45558 718/1 |
| 2016/0094546 A1* | 3/2016 | Innes | H04L 63/0815 713/156 |
| 2016/0112497 A1* | 4/2016 | Koushik | G06F 8/61 726/7 |
| 2016/0132214 A1* | 5/2016 | Koushik | G06F 9/455 715/741 |
| 2016/0132310 A1* | 5/2016 | Koushik | G06F 9/452 717/176 |
| 2016/0134616 A1* | 5/2016 | Koushik | H04L 63/08 726/9 |
| 2016/0134618 A1* | 5/2016 | Fardig | H04L 63/0815 726/8 |
| 2016/0139948 A1* | 5/2016 | Beveridge | G06F 9/5005 718/1 |
| 2016/0142497 A1* | 5/2016 | Ullrich | H04W 4/023 715/738 |
| 2016/0226788 A1* | 8/2016 | Chittigala | G06F 9/50 |
| 2016/0246341 A1* | 8/2016 | Burrell | G06F 1/26 |
| 2016/0352750 A1* | 12/2016 | Dotan | H04L 67/1095 |
| 2017/0083354 A1* | 3/2017 | Thomas | H04L 67/24 |
| 2017/0111446 A1* | 4/2017 | Rivera | H04L 67/1008 |
| 2017/0126812 A1* | 5/2017 | Singhal | H04L 67/145 |
| 2017/0185437 A1* | 6/2017 | Thomas | G06F 9/45558 |
| 2017/0201491 A1* | 7/2017 | Schmidt | H04L 65/1069 |
| 2017/0201588 A1* | 7/2017 | Schmidt | H04L 63/0876 |
| 2018/0007059 A1* | 1/2018 | Innes | H04L 63/107 |
| 2018/0183775 A1* | 6/2018 | Malkapuram | G06F 11/301 |
| 2019/0132381 A1* | 5/2019 | Momchilov | G06F 3/01 |

OTHER PUBLICATIONS

Citrix Product Documentation "Session Manager" http://docs.citrix.com/en-us/citrix-cloud/about-citrix-cloud-labs/session-manager.html: Aug. 4, 2016 pp. 9.

* cited by examiner

COMPUTER SYSTEM PROVIDING CLOUD-BASED SESSION PRELAUNCH FEATURES AND RELATED METHODS

TECHNICAL FIELD

This application generally relates to computer networks, and more particularly to creating and managing virtual sessions in conjunction with a cloud computing environment and related methods.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A computing system may include a virtualization server configured to run virtual sessions for a plurality of client devices. The system may further include a cloud computing service configured to prelaunch virtual sessions in a prelaunch session pool at the virtualization server without being requested by the plurality of client devices. Furthermore, the virtualization server may be configured to assign the virtual sessions from the prelaunch session pool to respective client devices on demand.

More particularly, the virtualization server may be configured to provide feedback to the cloud computing service regarding a number of available virtual sessions in the prelaunch session pool, and cooperate with the cloud computing service to prelaunch additional virtual sessions in the prelaunch session pool as the number of available virtual sessions in the prelaunch session pool falls below a session threshold. Furthermore, the cloud computing service may include a scalable prelaunch client to prelaunch the virtual sessions.

By way of example, the virtual sessions in the prelaunch session pool may comprise anonymous virtual sessions, as well as authenticated virtual sessions. Also by way of example, the virtual sessions in the prelaunch session pool may comprise virtual application sessions or virtual desktop sessions.

The cloud computing device may cooperate with the virtualization server to prelaunch the virtual sessions based upon an arrival of users associated with the client devices at a facility. Furthermore, the cloud computing device may cooperate with the virtualization server to prelaunch the virtual sessions based upon a historical usage pattern of users associated with the client devices at a facility.

In addition, the cloud computing device may further cooperate with the virtualization server to dynamically change a number of virtual sessions in the prelaunch session pool based upon a usage level of the prelaunch session pool. In accordance with another example, the virtualization server may comprise an on-premises virtualization server, and the system may further include a network gateway configured to interface the virtualization server with the cloud computing service. In some example implementations, the virtualization server may comprise a cloud-based virtualization server.

A related virtualization server, such as the one described briefly above, and method are also provided. The method may include using a cloud computing service to prelaunch virtual sessions in a prelaunch session pool at a virtualization server for a plurality of client devices. The method may further include, at the virtualization server, assigning the pre-launched virtual sessions from the prelaunch session pool to respective client devices on demand.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
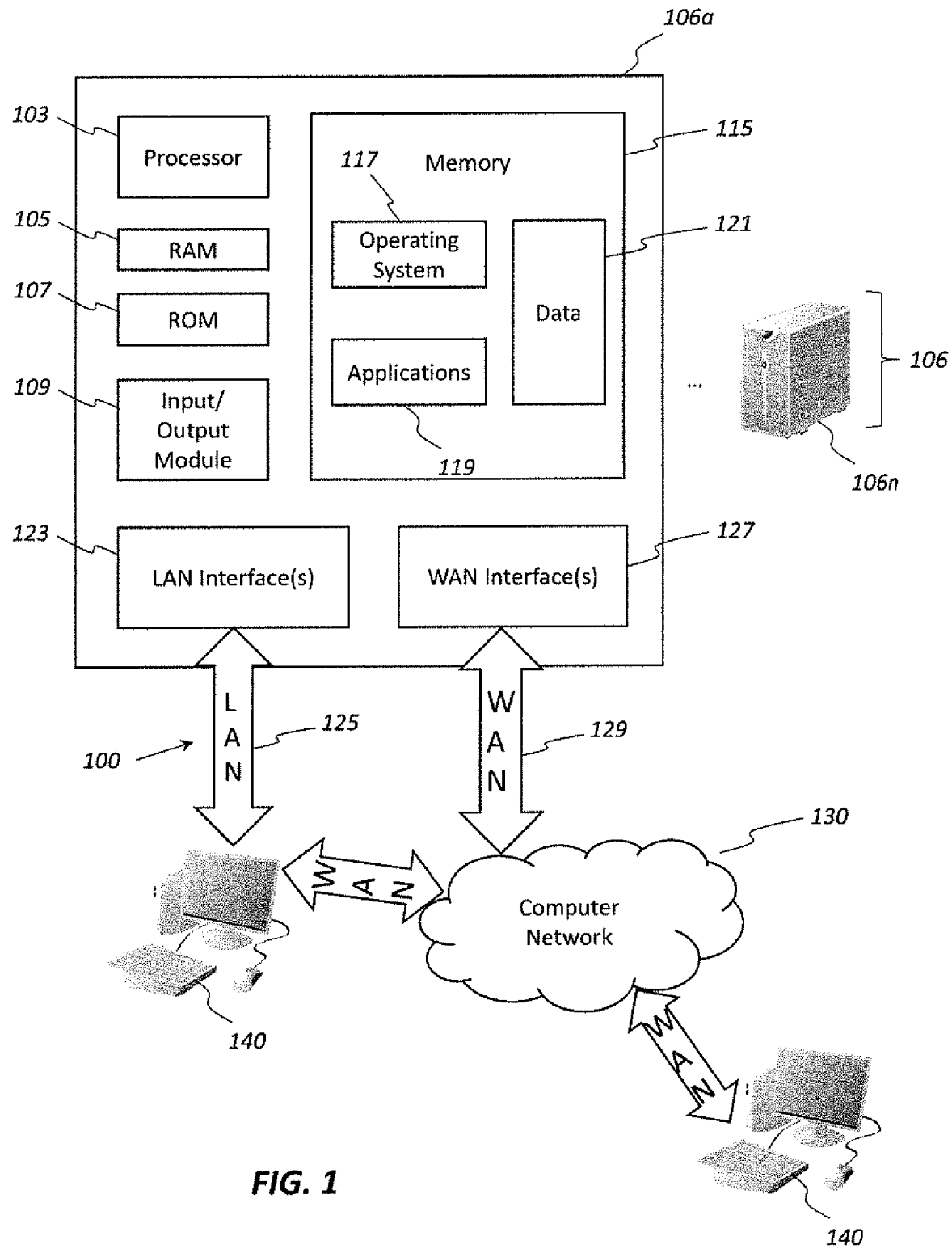
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform.

The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
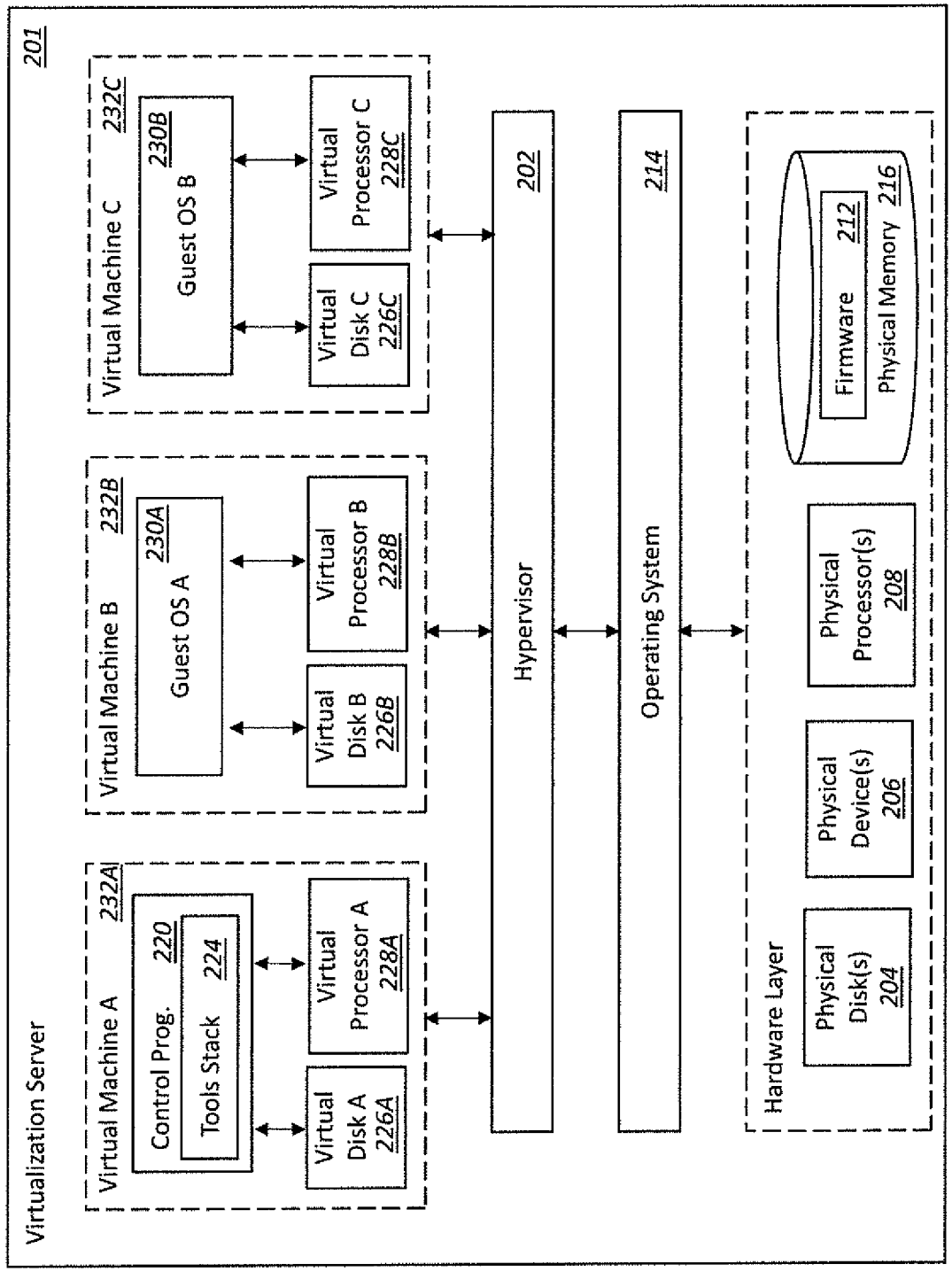
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
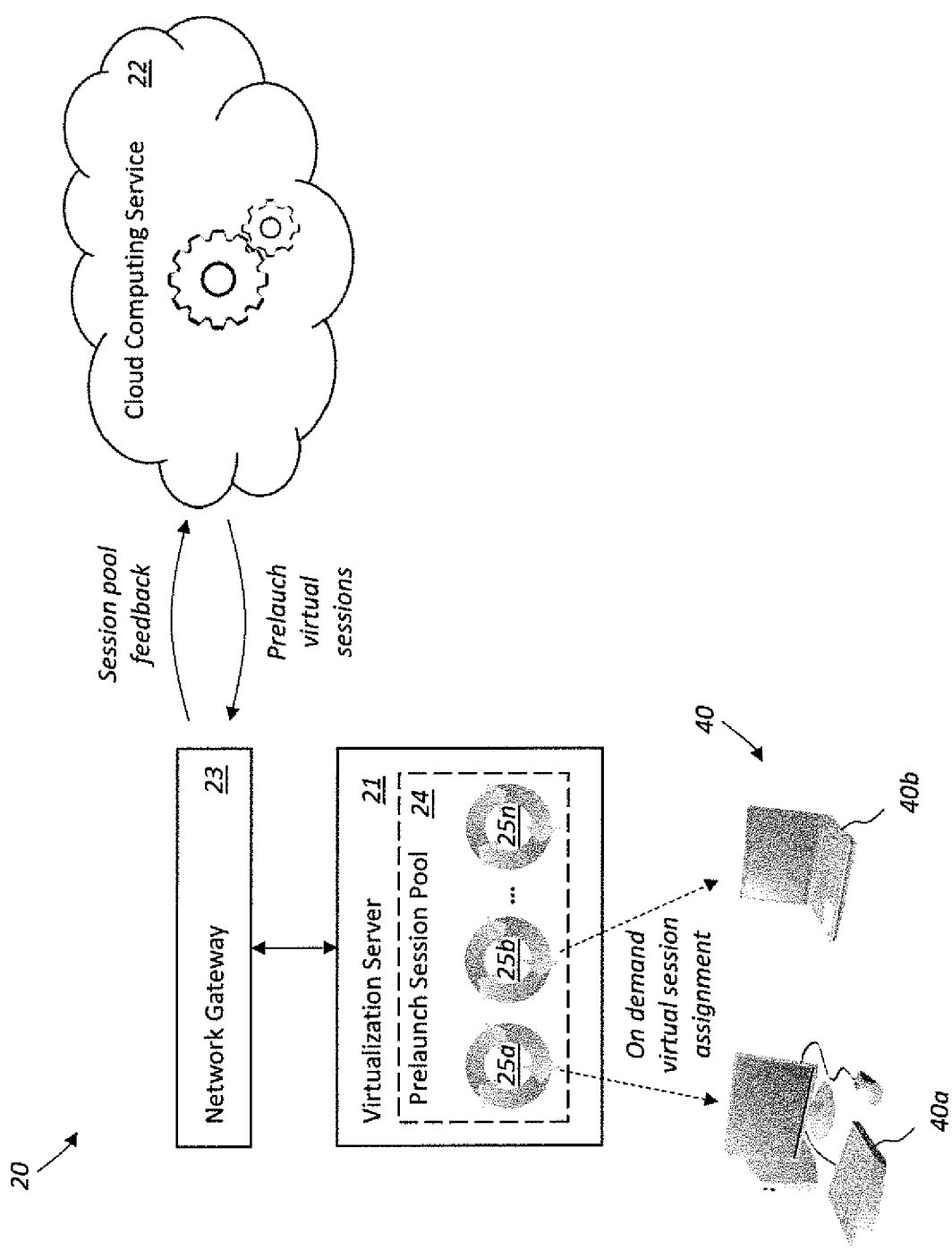
FIG. 3 is a schematic block diagram of a computing system providing virtual session prelaunch features for on demand use by client devices in accordance with an example embodiment.
Figure 6:
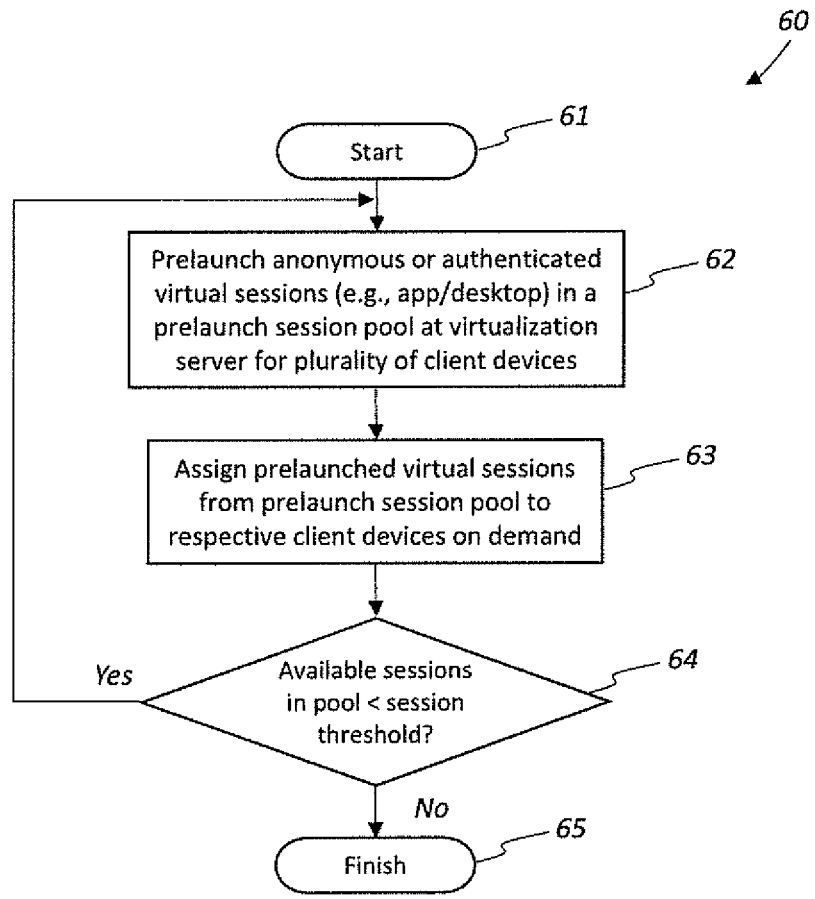
FIGS. 6 and 7 are flow diagrams illustrating method aspects associated with the systems of FIGS. 3-5.

Turning now to FIG. 3 and the flow diagram 60 of FIG. 6 which begins at Block 61, a computing system 20 and associated method aspects are first described. The system 20 illustratively includes a virtualization server 21, such as the one described above, which is configured to run various types of virtual sessions for a plurality of client devices 40 (e.g., virtual desktop sessions and/or virtual application sessions). It should be noted that while a single virtualization server 21 is shown in the illustrated example, more than one such server may be used in some embodiments to provide a distributed virtualization environment, if desired.

In a typical virtualization environment, when a client device 40 logs into the system, it requests one or more types of virtual sessions, and the virtualization server 21 would launch the requested session(s) responsive to the request. While the flexibility of accessing a virtual session from any different client devices 40 greatly simplifies the ability to work from anywhere, the virtual application launch process is different than a locally installed application. As such, there may be a delay or lag associated with launching of virtual application or desktop sessions as compared to a local device application or desktop. In particular, as virtualization servers typically may serve a very large number of users, the delay for requested sessions may be exacerbated during peak usage times (e.g., at the beginning of a work shift, etc.).

To this end, the system 20 further advantageously includes a cloud computing service 22 which cooperates with the virtualization server 21 to prelaunch virtual sessions 25a-25n in a prelaunch session pool 24 at the virtualization server without being requested by the plurality of client devices (Block 62). That is, the virtual sessions 25a-25n within the session pool 24 are created before ever being requested by the client devices 40. When the client devices 40 do eventually log into the system and/or request a virtual session, the virtualization server 21 may advantageously assign the virtual sessions 25a-25n from the prelaunch session pool 24 to respective client devices on demand, at Block 63. In the illustrated example, a client device 40a is assigned a prelaunch virtual session 25a from the pool 24, while the client device 40b is assigned a prelaunch virtual session 25b from the pool.

The virtualization server 21 may also be configured to provide feedback to the cloud computing service 22 regarding a number of available virtual sessions 25a-25n in the prelaunch session pool 24, and cooperate with the cloud computing service 22 to prelaunch additional virtual sessions in the prelaunch session pool as the number of available virtual sessions falls below a session threshold, at Block 64. For example, the feedback to the cloud computing service 22 may relate to a total number of virtual sessions 25a-25n which have been assigned to respective client devices 40, and how many unassigned virtual sessions remain in the pool 24, in which case the cloud computing service may determine when it is appropriate to prelaunch additional sessions. On the other hand, the virtualization server 21 may make the determination as to whether more or less virtual sessions should be pre-launched, and inform the cloud computing service 22 accordingly. The method of FIG. 6 illustratively concludes at Block 65.

Figure 5:
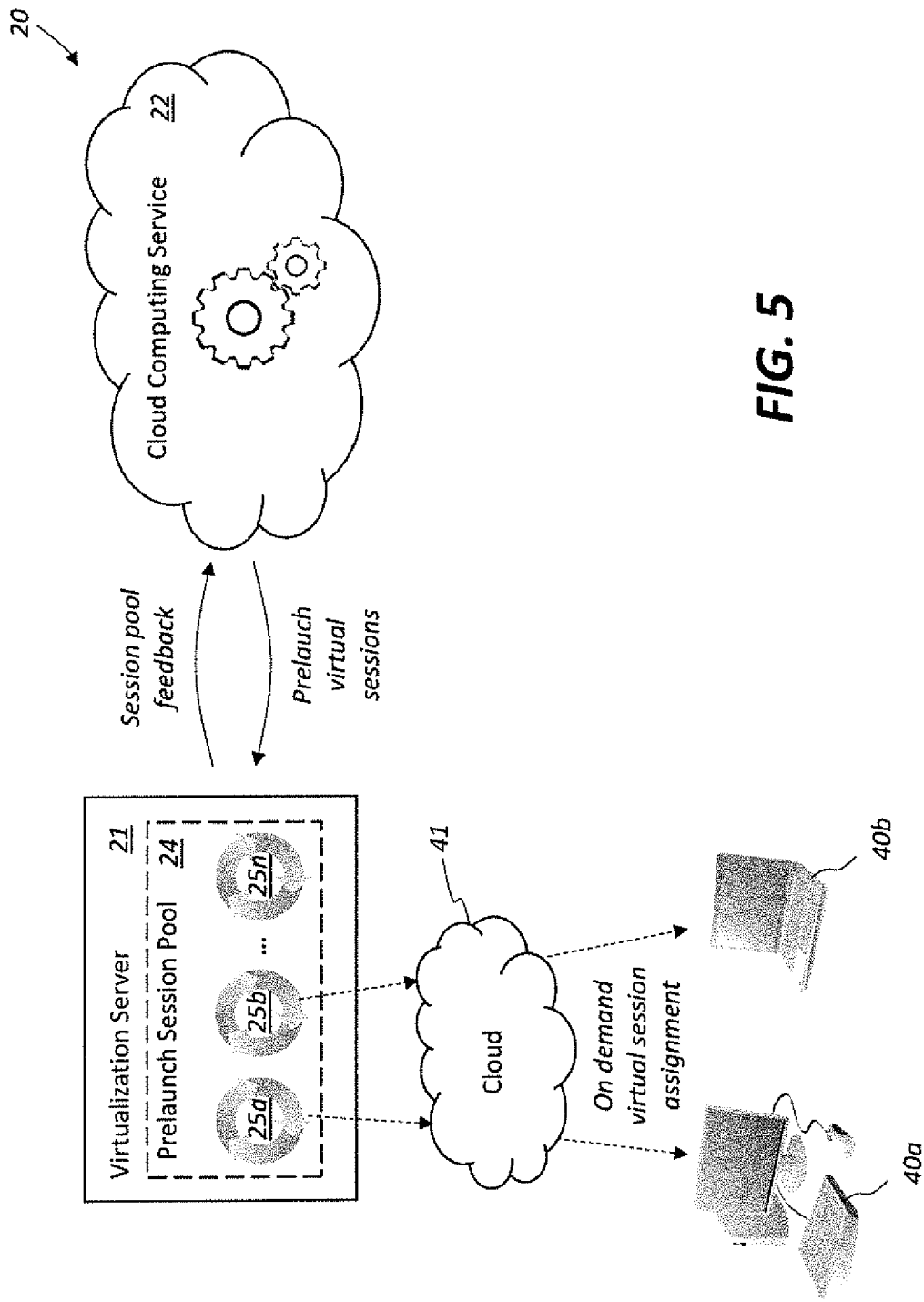
FIG. 5 is a schematic block diagram of another example computing system similar to that of FIG. 3.

In the illustrated example, the virtualization server 21 is an "on premises" server which is located at a customer's facility. In this regard, a network gateway 23 is provided to interface the virtualization server 21 with the cloud computing service 22. By way of example, if the virtualization server 21 utilizes the above-noted XENAPP and/or XENDESKTOP deployment, the NetScaler Unified Gateway from Citrix Systems may be used for the network gateway 23, although other gateways may be used in different deployments. Another example implementation in which the virtualization server 21 is cloud-based and communicates with the client devices 40 via a cloud network 41 is shown in FIG. 5, in which no network gateway is required between the virtualization server and the cloud computing service 22.

Figure 4:
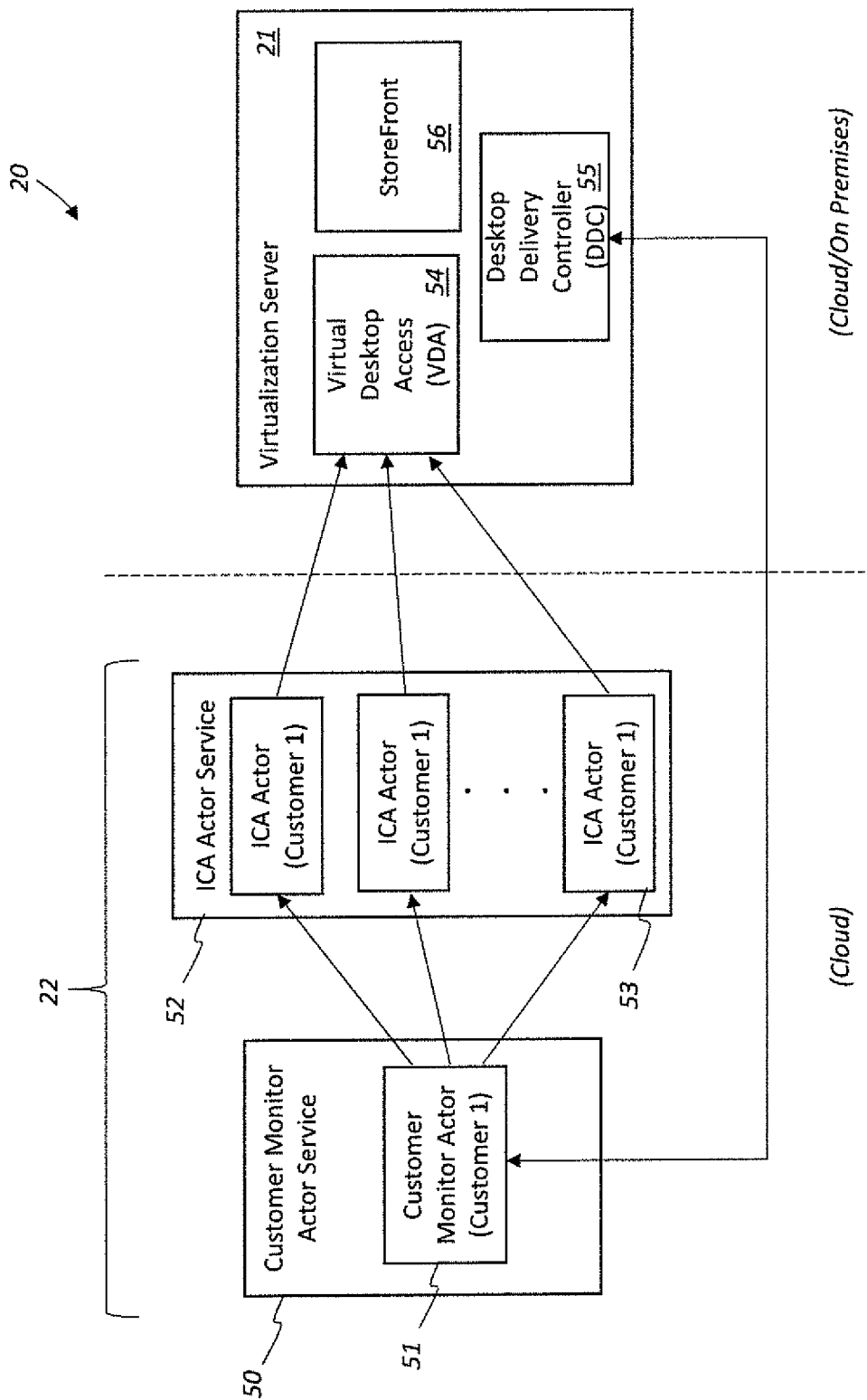
FIG. 4 is a schematic block diagram of an example implementation of the system of FIG. 4.

Because the cloud computing service 22 is cloud-based, as opposed to being resident with the on premises virtualization server 21, this advantageously allows for the use of an actor model to provide for mass scalability, as will now be described further with reference to the example implementation of FIG. 4. This example is presented with reference to a XENAPP/XENDESKTOP deployment at the virtualization server 21, but other VDI systems may be used in different embodiments. Moreover, in the illustrated example, the virtualization server 21 is for a single customer (Customer 1), such as a corporation, and only the operations of the cloud computing service 22 with respect to Customer 1 are shown and described for clarity of illustration. However, it is to be understood that both the virtualization server 21 and the cloud computing service 22 may support multiple different customers in other embodiments.

In the illustrated example, the cloud computing service 22 illustratively includes a customer monitor actor service 50 including one or more customer monitor actors 51, and an Independent Computing Architecture (ICA) actor service 52 including a plurality of ICA actors 53. The virtualization server 21 illustratively includes a virtual desktop access (VDA) module 54, a Desktop Delivery Controller (DDC) 55, and a storefront 56. The VDA module 54 is an authorization strategy that requires each device seeking access to a Windows virtual desktop in a VDI to be licensed. The DDC 55 is used to automate control of a condition or process by a client device. STOREFRONT is an enterprise app store from Citrix Systems that improves security and simplifies deployments across CITRIX RECEIVER on any platform. CITRIX RECEIVER is client software that provides access to XENDESKTOP and XENAPP installations.

In the illustrated example, the cloud computing service 22 is a scalable cloud based service that performs a server side prelaunch of Windows sessions using Microsoft's virtual actor capability in service fabric. The individual ICA actors 53 may be created and destroyed on demand by customer monitor actors 51 responsible for determining how many sessions to prelaunch.

Since it is a cloud service that pre-launches the virtual sessions 25a-25n, this makes it compatible with both on premises and cloud based virtual server farms. By way of contrast, a server-side prelaunch requires an on premises service that supports only on premises farms, and with associated difficulties in scaling. Using the cloud computing service 22, on the other hand, allows for an actor model or other suitable approach to provide for mass scalability. Moreover, this also allows the cloud computing service 22 to be compatible with different receiver versions, i.e., it may be "agnostic" to the given receiver version of particular virtualization server 21.

Responsive to the ICA actors, the VDA module 54 may advantageously create the prelaunch session pool 24. Sessions may be pseudo-randomly chosen, chosen in sequential order, or by other suitable selection method from the pool 24, and then connected to a given client device 40. This implementation is compatible with all styles of prelaunch and general session launch management, including the use of anonymous sessions (i.e., no user credentials required), as well as with username and password combinations (i.e., authenticated sessions).

In the illustrated example, local, anonymous, Windows users are the basis for the virtual sessions 25a-25n in the pool 24, which advantageously eliminates the need to store passwords. The cloud computing service 22 advantageously provides a multi-tenant cloud service to replenish these anonymous session pool(s) 24.

More particularly, in accordance with an example implementation, the session manager service which is provided by the cloud computing service 22 may be a multi-tenant service based in Microsoft's Service Fabric platform. Each tenant of the service receives one or more dedicated customer monitor actors 51, which may constantly poll the customer's DDC 55 for session counts and other parameters. When the customer monitor actor 51 determines that the customer's configured anonymous session pool 24 requires more sessions 24a-25n, the customer monitor actor spawns and keeps track of one or more ICA client actors 53 that launch more sessions to the session pool. By way of example, one session prelaunch process may be performed per ICA actor 53, although this may be configured differently in other embodiments. The various customer monitor and ICA actors 51, 53 may advantageously be spawned and moved around any node in the cloud cluster, leading to a scalable solution for multi-tenant server side prelaunch.

In the present example, the customer monitor actor 51 monitors the tenant's DDC 55 for session levels, and ICA actors 53 perform the prelaunch. As noted above, the customer monitor actor service 50 and ICA actor service 52 may include many actors from many different tenants or customers. The actors 51, 53 are distributed across the nodes in the cluster by the service fabric framework.

It should be noted that other suitable approaches may also be used to implement virtual session prelaunch from the cloud computing service 22. For example, in some implementations a service within the DDC 55 may be used to prelaunch sessions with domain accounts. Furthermore, Windows Receiver may be used to perform a client side prelaunch when a user first logs in on the client.

By way of example, anonymous sessions may be used in healthcare environments or in kiosks that have their own security and user management. In these cases, users do not need to log in through a receiver, but rather use a combination of network security and authentication within the application. Providing prelaunch via the cloud computing service 22 advantageously cuts down on the application launch time by pre-launching select apps (or desktops) and instantly connecting the user to the app interface. This provides improved performance, especially during "logon storms", while maintaining the same security as standard anonymous sessions. The cloud computing service 22 may further allow enabling or disabling of prelaunch on specific anonymous delivery groups.

As a result, the system 20 advantageously provides for access to pre-launched, anonymous sessions from different receivers (i.e., not just from Windows). Moreover, configuration may be readily performed for how many sessions should exist per server in the delivery group, including both active sessions with users connected and pre-launched sessions. For example, if there are 2 VDAs (i.e., XENAPP servers) with 10 sessions configured for each VDA, there are 20 sessions in the delivery group. When a user logs in and out, there would then be 19 sessions and the session manager knows to refill the delivery group with one more pre-launched session. When a user disconnects from the session, they are automatically logged off, preventing any accidental connections from unintended users. Note that active users may be provided with priority over a pre-launch session, which helps to avoid licensing conflicts. Once the delivery groups are set up, the app that should be pre-launched in that delivery group may be selected.

Figure 7:
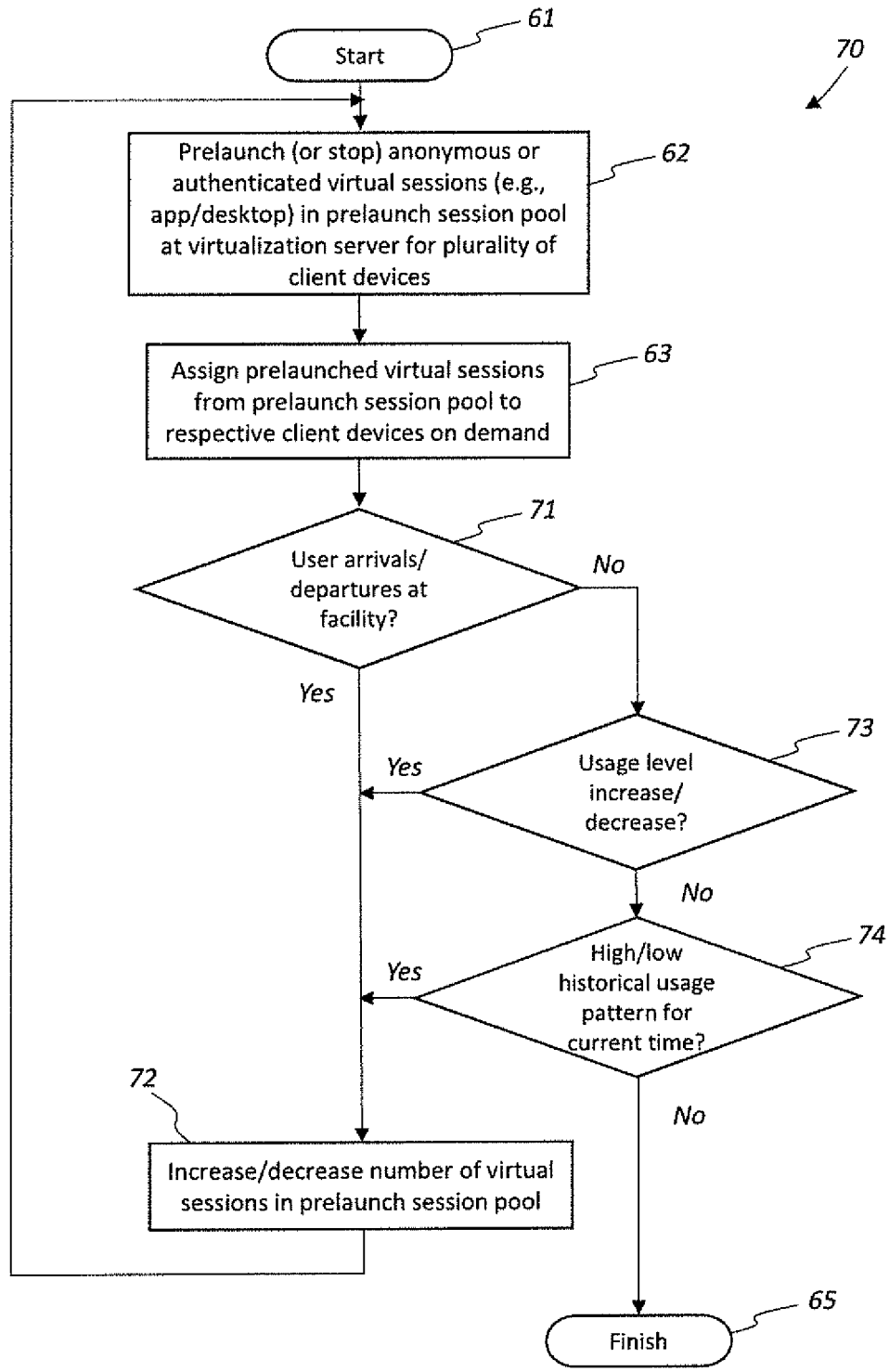

Referring additionally to the flow diagram 70 of FIG. 7, further features which may be incorporated in the above-described systems are now described. For example, the cloud computing service 22 may cooperate with the virtualization server 21 to prelaunch the virtual sessions 25a-25n based upon an arrival of users associated with the client devices at a facility, at Block 71. For example, as users arrive a facility and badge in at a security station, the arrival of increasing numbers of users at the facility may be communicated to the virtualization server 21 which cooperates with the cloud computing service 22 to prelaunch more virtual sessions 25a-25n in the prelaunch session pool 24. Other approaches to determining proximity may also be used, such as those described in U.S. Pat. Pub. 2014/0344446 to Rjeili et al., which is also assigned to the present Assignee and is hereby incorporated herein in its entirety by reference. The number of virtual sessions in the prelaunch session pool 24 may accordingly be increased or decreased as appropriate, at Block 72.

Another approach is to monitor the usage level of the session pool, at Block 73, and increase/decrease the number of virtual sessions 25a-25n in the prelaunch session pool 24 accordingly. Yet another approach is to increase or decrease the number of virtual sessions 25a-25n in the prelaunch session pool 24 based upon historical usage trends and the current date/time. Thus, for example, if peak usage occurs between 2:00 PM and 4:00 PM on Tuesdays, then at 2:00 PM on the next Tuesday more sessions 25a-25n may be pre-launched, while at 4:00 PM the number of sessions 24 in the pool may be stepped down, either of which may be done all at once or on a staggered basis. In other words, sessions may be dynamically pre-launched during certain parts of the day when use of the session pool 24 is the greatest, and scaled back down during down times.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A computing system comprising:
at least one virtualization server configured to run virtual sessions for a plurality of client devices, the virtual sessions being affiliated with a first tenant in a first prelaunch session pool and a second tenant in a second prelaunch session pool; and
a cloud computing service comprising
a customer monitor actor configured to poll the at least one virtualization server for session counts associated with the first and second prelaunch session pools and determine that the session counts are below at least one session threshold, and
a plurality of individual actors created for the first and second tenants by the customer monitor actor based upon the session counts being below the at least one session threshold, the individual actors being configured to prelaunch virtual sessions in the first prelaunch session pool or the second prelaunch session pool at the at least one virtualization server without being requested by or assigned to the plurality of client devices, the virtual sessions in the first prelaunch session pool configured to prelaunch at least one application different than applications of the second prelaunch session pool;
the virtualization server being configured to choose prelaunch virtual sessions for assignment from the first and second prelaunch session pools, and assign the virtual sessions from the first and second prelaunch session pools to respective client devices in a predetermined order on demand.

2. The computing system of claim 1 wherein the virtual sessions in the first and second prelaunch session pools comprise anonymous virtual sessions.

3. The computing system of claim 1 wherein the virtual sessions in the first and second prelaunch session pools comprise authenticated virtual sessions.

4. The computing system of claim 1 wherein the virtual sessions in the first and second prelaunch session pools comprise virtual application sessions.

5. The computing system of claim 1 wherein the virtual sessions in the first and second prelaunch session pools comprise virtual desktop sessions.

6. The computing system of claim 1 wherein the cloud computing service cooperates with the virtualization server to prelaunch the virtual sessions based upon an arrival of users associated with the client devices at a facility.

7. The computing system of claim 1 wherein the cloud computing service cooperates with the virtualization server to prelaunch the virtual sessions based upon a historical usage pattern of users associated with the client devices at a facility.

8. The computing system of claim 1 wherein the cloud computing service cooperates with the virtualization server to dynamically change a number of virtual sessions in the prelaunch session pool based upon a usage level of the first and second prelaunch session pools.

9. The computing system of claim 1 wherein the virtualization server comprises an on-premises virtualization server; and further comprising a network gateway configured to interface the virtualization server with the cloud computing service.

10. The computing system of claim 1 wherein the virtualization server comprises a cloud-based virtualization server.

11. A method comprising:
using a cloud computing service to prelaunch virtual sessions at a virtualization server for a plurality of client devices without being requested by or assigned to the plurality of client devices, the virtual sessions being affiliated with a first tenant in a first prelaunch session pool and a second tenant in a second prelaunch session pool, the cloud computing service prelaunching the virtual sessions by
polling the at least one virtualization server for session counts associated with the first and second prelaunch session pools and determining that the session counts are below at least one session threshold using a customer monitor actor,
using the customer monitor actor to create a plurality of individual actors for the first and second tenants based upon the session counts being below the at least one session threshold, and
using the individual actors to prelaunch the virtual sessions in the first prelaunch session pool or the second prelaunch session pool at the at least one virtualization server, the virtual sessions in the first prelaunch session pool configured to prelaunch at least one application different than applications of the second prelaunch session pool; and
at the virtualization server, choosing prelaunch virtual sessions for assignment from the first and second prelaunch session pools, and assigning the prelaunched virtual sessions from the first and second prelaunch session pools to respective client devices in a predetermined order on demand.

12. The method of claim 11 wherein the virtual sessions comprise anonymous virtual sessions.

13. The method of claim 11 wherein the virtual sessions comprise virtual application sessions.

14. The method of claim 11 further comprising moving the individual actors between the first and second tenants based upon the session counts.

15. The method of claim 11 wherein polling further comprises repeatedly polling the at least one virtualization server from the customer monitor actor for the session counts.

16. The method of claim 11 further comprising, at the at least one virtualization server, prioritizing active users for assignment of the prelaunched virtual sessions over non-active users.

* * * * *